United States Patent
Saruta et al.

(10) Patent No.: US 9,147,130 B2
(45) Date of Patent: Sep. 29, 2015

(54) INFORMATION PROCESSING METHOD, INFORMATION PROCESSING APPARATUS, AND RECORDING MEDIUM FOR IDENTIFYING A CLASS OF AN OBJECT BY USING A PLURALITY OF DISCRIMINATORS

(71) Applicant: CANON KABUSHIKI KAISHA, Tokyo (JP)

(72) Inventors: Takayuki Saruta, Tokyo (JP); Masakazu Matsugu, Yokohama (JP); Katsuhiko Mori, Kawasaki (JP); Yusuke Mitarai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 260 days.

(21) Appl. No.: 13/685,911

(22) Filed: Nov. 27, 2012

(65) Prior Publication Data

US 2013/0142443 A1 Jun. 6, 2013

(30) Foreign Application Priority Data

Dec. 1, 2011 (JP) ................................. 2011-264117

(51) Int. Cl.
*G06K 9/62* (2006.01)
*G06K 9/68* (2006.01)

(52) U.S. Cl.
CPC ............ *G06K 9/6267* (2013.01); *G06K 9/6807* (2013.01)

(58) Field of Classification Search
None
See application file for complete search history.

(56) References Cited

U.S. PATENT DOCUMENTS

| | | | | |
|---|---|---|---|---|
| 4,773,099 A | * | 9/1988 | Bokser | 382/225 |
| 5,982,944 A | * | 11/1999 | Vaidyanathan et al. | 382/271 |
| 6,009,199 A | | 12/1999 | Ho | |
| 6,324,532 B1 | * | 11/2001 | Spence et al. | 706/27 |
| 7,315,650 B2 | * | 1/2008 | Kumiya et al. | 382/190 |
| 7,848,548 B1 | * | 12/2010 | Moon et al. | 382/118 |
| 8,369,574 B2 | * | 2/2013 | Hu | 382/103 |
| 2002/0057838 A1 | * | 5/2002 | Steger | 382/197 |

(Continued)

FOREIGN PATENT DOCUMENTS

| | | |
|---|---|---|
| JP | 3447717 B | 9/2003 |
| JP | 3925011 B | 6/2007 |
| JP | 2008-257649 A | 10/2008 |

OTHER PUBLICATIONS

"Visual Learning and Recognition of 3-D Objects from Appearance," Hiroshi Murase, et al, International Journal of Computer Vision, 14, pp. 5-24, 1995.*

(Continued)

*Primary Examiner* — Wenpeng Chen
(74) *Attorney, Agent, or Firm* — Carter, DeLuca, Farrell & Schmidt, LLP

(57) ABSTRACT

The robustness of discriminating results at each stage is improved in discrimination processing in which a plurality of stages of discriminators are used to identify an object. An information processing apparatus in which a plurality of stages of the discriminators are used to identify a class of an object, comprises a candidate class output unit that acquires as a candidate class a class discriminated at a first stage of the discriminators, and an extended class setting unit that sets in a second stage of the discriminators, a class of a second stage of the discriminators, which is defined as an extended partial space of a partial space defined by a candidate class in a discriminating space used in discriminating the candidate class by the first stage of the discriminators, as a class to be discriminated at this second stage of the discriminators.

5 Claims, 12 Drawing Sheets

(56) References Cited

U.S. PATENT DOCUMENTS

| | | | |
|---|---|---|---|
| 2003/0069728 A1* | 4/2003 | Tato et al. | 704/231 |
| 2003/0108244 A1* | 6/2003 | Li et al. | 382/227 |
| 2003/0110147 A1* | 6/2003 | Li et al. | 706/1 |
| 2003/0161537 A1* | 8/2003 | Maeda et al. | 382/218 |
| 2003/0194132 A1* | 10/2003 | Kiyuna | 382/190 |
| 2004/0042661 A1* | 3/2004 | Ulrich et al. | 382/181 |
| 2005/0069193 A1* | 3/2005 | Kumiya et al. | 382/152 |
| 2006/0088207 A1* | 4/2006 | Schneiderman | 382/159 |
| 2007/0033170 A1* | 2/2007 | Sull et al. | 707/3 |
| 2007/0086627 A1* | 4/2007 | Kim | 382/118 |
| 2007/0086660 A1* | 4/2007 | Ai et al. | 382/226 |
| 2007/0217676 A1* | 9/2007 | Grauman et al. | 382/170 |
| 2007/0271266 A1* | 11/2007 | Acharya et al. | 707/6 |
| 2008/0085050 A1* | 4/2008 | Barbu et al. | 382/154 |
| 2008/0187174 A1* | 8/2008 | Metaxas et al. | 382/103 |
| 2008/0240532 A1* | 10/2008 | Carneiro et al. | 382/131 |
| 2009/0067729 A1* | 3/2009 | Turkelson et al. | 382/224 |
| 2009/0093717 A1* | 4/2009 | Carneiro et al. | 600/443 |
| 2010/0329529 A1* | 12/2010 | Feldman et al. | 382/131 |
| 2012/0230545 A1* | 9/2012 | Zhang et al. | 382/103 |
| 2012/0274781 A1* | 11/2012 | Shet et al. | 348/169 |
| 2013/0039569 A1* | 2/2013 | Kashiwagi et al. | 382/154 |

OTHER PUBLICATIONS

B. Leibe et al., "Robust Object Detection with Interleaved Categorization and Segmentation", IJCV Special Issue on Learning for Vision for Learning, Aug. 2007.

* cited by examiner

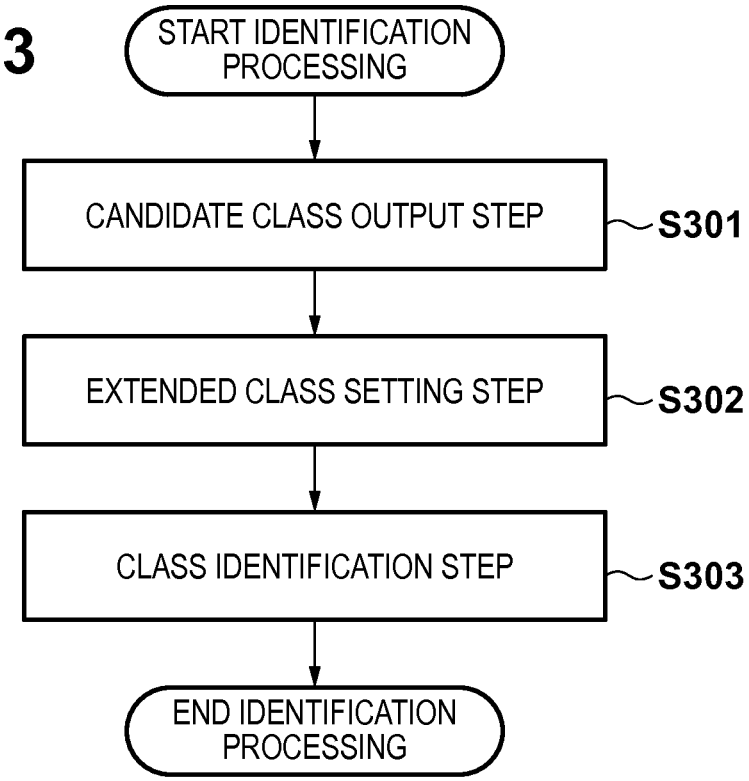
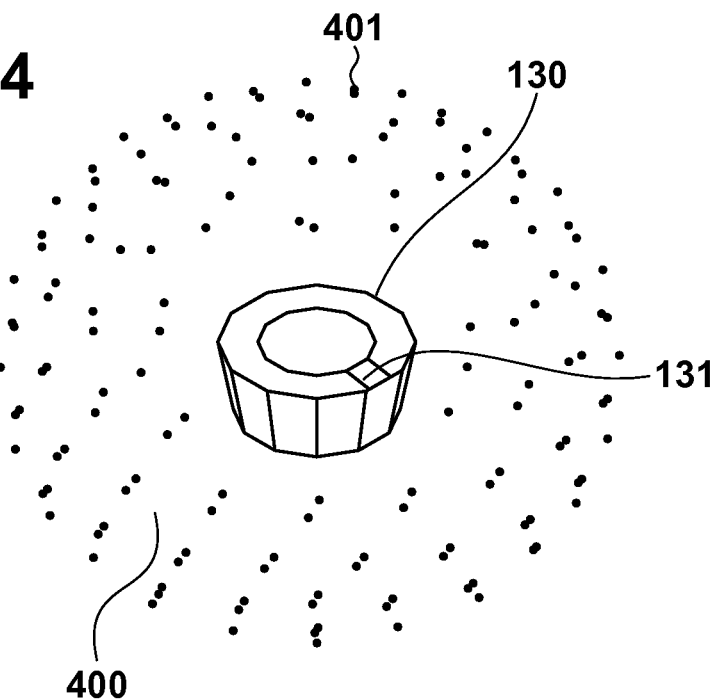

F I G. 20
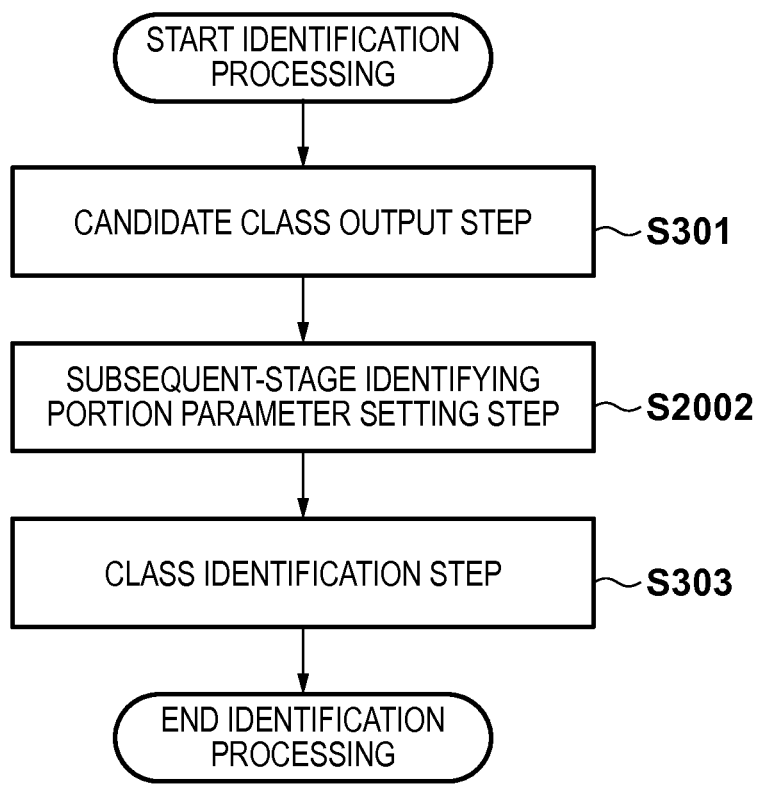

INFORMATION PROCESSING METHOD, INFORMATION PROCESSING APPARATUS, AND RECORDING MEDIUM FOR IDENTIFYING A CLASS OF AN OBJECT BY USING A PLURALITY OF DISCRIMINATORS

BACKGROUND OF THE INVENTION

1. Field of the Invention

The present invention relates to information processing technology that can be applied to recognition processing in which an object is recognized from an image obtained by capturing said object.

2. Description of the Related Art

Conventionally there has been active research into recognition methods in which a computer learns characteristic quantities extracted from images obtained by capturing various objects, and the type of objects included in a newly input image is recognized.

There has also been research into using model information and so forth about an object to recognize not only the type of object, but also its position and orientation.

For example, in "Robust Object Detection with Interleaved Categorization and Segmentation" (IJCV Special Issue on Learning for Vision for Learning, August 2007) by B. Leibe, there is proposed a method in which characteristic points extracted from a learning image and made into a codebook are associated with characteristic points extracted from an inputted image, and the center position of an object is identified by probabilistic voting (implicit-shape-model). With this method, it is possible to identify not only the type of object, but also the position and orientation of the object.

Also, with the method disclosed in Japanese Patent Laid-Open No. 2008-257649, first a characteristic quantity is calculated for each characteristic point extracted from an input image, these are contrasted with the characteristic quantities of characteristic points calculated for a learning image, and similar characteristic points are set as corresponding points. Then, reference points are calculated for the characteristic points of the input image by using the vector from the characteristic points to the reference points calculated ahead of time with learning images having mutually different types, positions, and orientations. Then, the positions of the calculated reference points are voted on a specific image plane, and it is decided whether or not at least a specific number of the calculated reference points are present within a small region in a specific image plane. If they are present, then a learning image having vectors used in the calculation of these reference points is determined to be a learning image that is similar to the input image, and this identifies the type, position, and orientation of the object.

However, if the user tries to identify not only the type of the object, but also its position or orientation, a problem encountered with the above recognition method was that recognition was difficult when the input image was small or when there were few characteristic points that were effective for the recognition of position or orientation. Because of this, when there are a plurality of recognition categories (type, position, orientation, etc.), a recognition technique is generally used in which a plurality of stages of discriminators are used to gradually narrow down the candidates, and research has also been underway into recognition technology such as this.

A coarse-to-fine method is an example of such recognition technology. With a coarse-to-fine method, a class identified by the first stage of discriminators is set coarser than a class that is ultimately identified. More specifically, in the discrimination of the type of an object, the first stage of discriminators performs discrimination processing upon combining a plurality of type classes into a single class. Similarly, in the discrimination of the orientation of an object, the first stage of discriminators performs discrimination processing upon combining a plurality of orientation classes into a single class. That is, whatever the discrimination category may be (type, orientation), the first stage of discriminators narrows down the candidate class through coarse setting of the class, and the second and subsequent stages of discriminators are used to further narrow down the class from among this candidate class, and thereby identifies the final class.

As an example of a coarse-to-fine method, Japanese Patent 3,925,011 proposes a method in which pattern recognition is performed by using a plurality of stages of discriminators to gradually narrow down the candidate class at each stage. In the case of Japanese Patent 3,925,011, a reference pattern to be used in narrowing down the stages is decided ahead of time for every discrimination category, and these reference patterns are used to perform learning processing and produce a dictionary. The various classes here are set so that there are more reference patterns in higher-numbered stages. A candidate class is detected for an discrimination object during discrimination processing at each stage, and the candidate class closest to the discrimination object is narrowed down by using a dictionary configured to become more detailed in stages. After this, if the result of discrimination processing at each stage up to the K-th stage is the same candidate class, then that candidate class is output as the discrimination result.

Furthermore, in the case of Japanese Patent 3,447,717 an entire learning template is used to perform a rotation coarse search and narrow down the search range in template matching. Also, the orientation of an object is ultimately identified by using a partial template of a preset learning template. In Japanese Patent 3,447,717, there are a plurality of partial templates, and a characteristic portion of the object is specified in each of the partial templates. A partial template is subjected to template matching within a narrowed search range, and the final orientation is identified on the basis of the positional relation of the partial templates.

However, when any coarse-to-fine method is used, as the number of stages of discriminators increases, minute differences require the matching of templates and a decision about class, etc, so a problem is that discrimination becomes more difficult. Because of this, when a plurality of stages of discriminators are used to perform recognition processing on an object, it is necessary to raise the robustness for a candidate class that is narrowed down as the stage number of discriminators increases, so that there will be no drop in recognition accuracy.

SUMMARY OF THE INVENTION

The present invention was conceived in light of the above problem.

To achieve the stated object, the information processing apparatus according to the present invention comprises the following constitution. Specifically, it is an information processing apparatus capable of executing discrimination processing to identify a class of an object by using a plurality of stages of discriminators, comprising: an acquisition unit that acquires as a candidate class a class identified at a first stage of discriminators; and a setting unit that sets a class of a second stage of discriminators, in which a partial space defined by the candidate class is defined as an extended partial space in a discriminating space used in identifying the candidate class by the first stage of discriminators, as a class to be identified at this second stage of discriminators.

With the present invention, it is possible to increase the robustness of discrimination results at each stage in discrimination processing to identify an object by using a plurality of stages of discriminators.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart showing the flow of discrimination processing performed on an object 130 by the information processing apparatus 120.

FIG. 4 is a diagram illustrating a learning image.

FIG. 20 is a flowchart showing the flow of discrimination processing performed on the object 130 by the information processing apparatus 1900.

DESCRIPTION OF THE EMBODIMENTS

Figure 1:
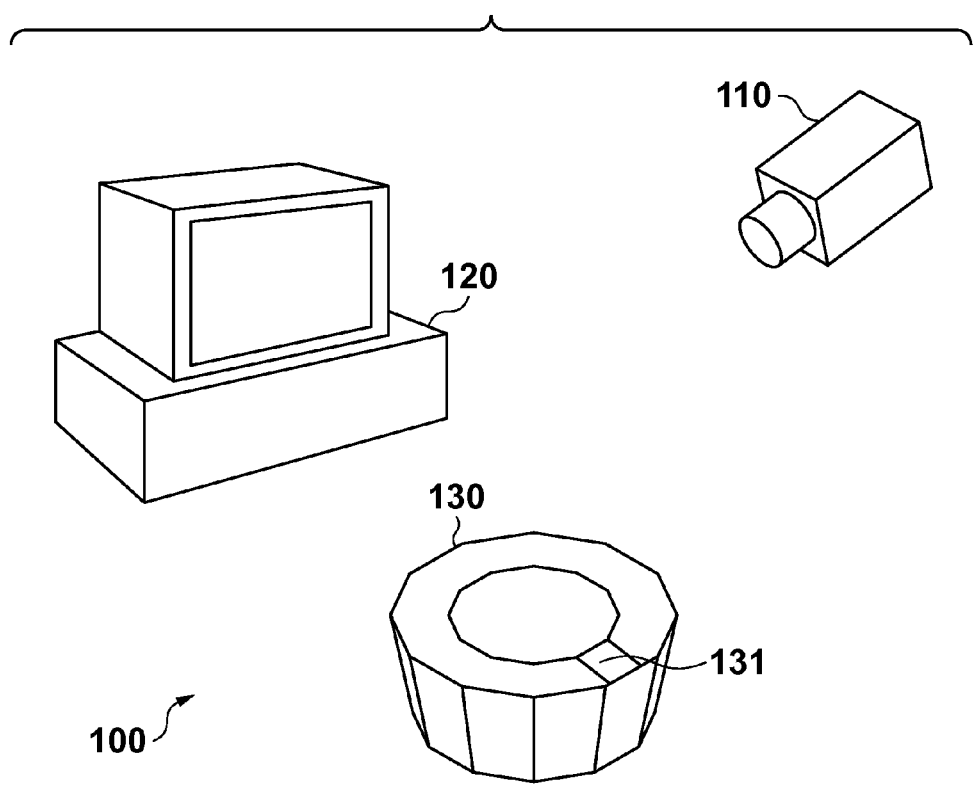
FIG. 1 is a diagram of the external configuration of an identification processing system 100 comprising an information processing apparatus 120.

Embodiments of the present invention will now be described in detail in accordance with the accompanying drawings.

Of the embodiments described in detail below, in a first embodiment, a candidate class output by a first stage of discriminators when this first stage of discriminators executes discrimination processing is extended in a discriminating space used in the execution of this discrimination processing. This extended candidate class (extended class) is subjected to discrimination processing by a second stage of discriminators, which increases the robustness of the discrimination processing at the second stage of discriminators (the stability of discrimination processing with respect to the effect of disturbance, such as a change in environment).

In a second embodiment, the candidate class output by the first stage of discriminators is marginalized by the execution of discrimination processing by a first stage of discriminators. The term marginalization here means finding the probability ("marginal probability") expressed by deleting the probability variable of a specific characteristic out of the probability variables expressing the existence probability of each of a plurality of characteristics utilized in identifying candidate classes. The robustness of discrimination processing at a second stage of discriminators is improved by having the second stage of discriminators execute discrimination processing in which this marginal probability is used.

In a third embodiment, the candidate class output by executing discrimination processing with a first stage of discriminators is set in a second stage of discriminators. In executing the discrimination processing of this candidate class at the second stage of discriminators, a plurality of classes and a characteristic point that is valid for the discrimination category to be identified by the second stage of discriminators (such as the orientation of an object), which is defined ahead of time for each candidate class, are set. Consequently, in the discrimination of a candidate class at the second stage of discriminators, discrimination results for the characteristic points of a plurality of classes newly set for the candidate classes can be determined all together, and the robustness of discrimination processing at the second stage of discriminators can be improved.

The present invention is applied to discrimination processing in which a plurality of stages of discriminators are used to identify an object, and the discrimination processing executed by the discriminators is not itself limited to any particular method. However, in the embodiments that follow, for the sake of convenience a case will be described in which an discriminators that executes discrimination processing by calculating a reference point and voting in a specific image plane is used as the first stage of discriminators.

Also, the discrimination processing to which the present invention can be applied includes a variety of discrimination categories, such as the type and orientation of the object, but of the embodiments that follow, in the first and third embodiments a case will be described in which the discrimination categories are the type and orientation of an object. In the second embodiment, a case will be described in which the discrimination category is just the type of an object.

First Embodiment

1. External Configuration of Identification Processing System

The external configuration of an identification processing system comprising the information processing apparatus according to this embodiment will first be described. FIG. 1 is a diagram of the external configuration of an identification processing system 100 comprising an information processing apparatus 120 according to this embodiment. In FIG. 1, 110 is an imaging unit (such as a camera), which captures an image of an object 130. 120 is an information processing apparatus, which identifies the type and orientation of the object 130 on the basis of an image (input image) obtained by capturing an image of the object 130 with the imaging unit 110.

2. Functional Configuration of Information Processing Apparatus

Figure 2:
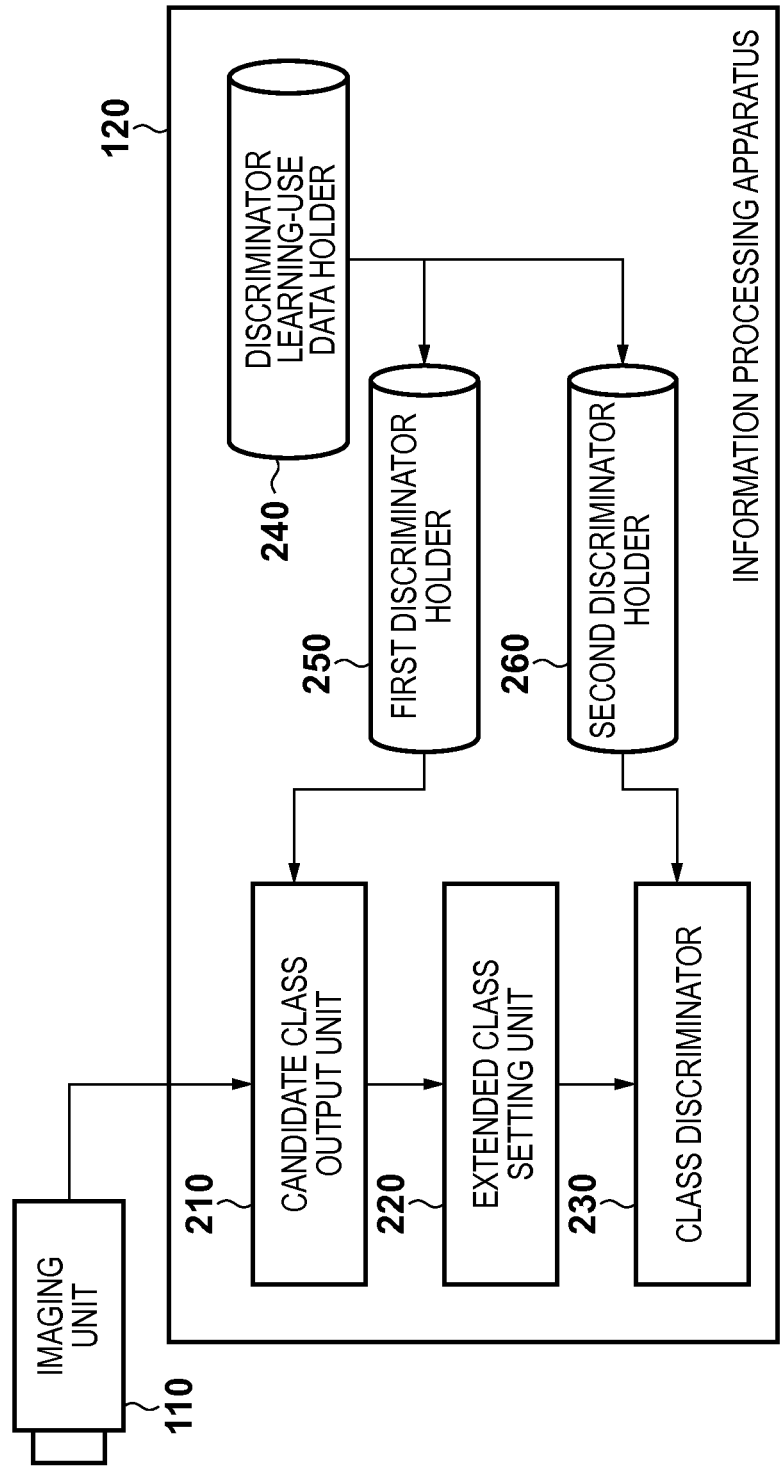
FIG. 2 is a diagram illustrating the functional configuration of the information processing apparatus 120.

Next, the functional configuration of the information processing apparatus 120 will be described. FIG. 2 is a diagram illustrating the functional configuration of the information processing apparatus 120. As shown in FIG. 2, the information processing apparatus 120 comprises a candidate class output unit 210, an extended class setting unit 220, a class identifier 230, an discriminator learning-use data holder 240, a first discriminator holder 250, and a second discriminator holder 260.

In this embodiment, the discriminator learning-use data holder 240, the first discriminator holder 250, and the second discriminator holder 260 are described as being disposed inside the information processing apparatus 120, but the present invention is not necessarily limited to this. For instance, they may be disposed outside the information processing apparatus 120, in a nonvolatile memory apparatus connected executably by the information processing apparatus 120.

3. Summary of Discrimination Processing by Information Processing Apparatus

Next, the discrimination processing performed on the object 130 by the information processing apparatus 120 will be described. FIG. 3 is a flowchart showing the flow of discrimination processing performed on the object 130 by the information processing apparatus 120.

When discrimination processing is begun, in step S301, the candidate class output unit 210 executes a candidate class output step. More specifically, the candidate class output unit 210 causes a first stage of discriminators (first discriminator) held in the first discriminator holder 250 to execute discrimination processing on an input image obtained by capturing an image of the object 130, and thereby acquires a plurality of candidate classes from this first discriminator. The plurality of acquired candidate classes are sent to the extended class setting unit 220. The term "class" here refers to the range (partial space) over which a given classification label is assigned in a discriminating space. That is, when the object 130 is identified by the first discriminator as belonging to a certain range, that object 130 is identified as being a class defined by that range. A class defined by performing learning processing by using a learning image stored ahead of time in the discriminator learning-use data holder 240 (the class for the type and orientation of the object) is set in the first discriminator.

In step S302, the extended class setting unit 220 executes an extended class setting step. More specifically, the discrimination robustness is improved for at least one of the plurality of candidate classes output from the candidate class output unit 210 in the candidate class output step (step S301). More specifically, the range in the discriminating space of the first discriminator defined by this candidate class is extended. The class defined by the extended range is then sent as an extended class to the class identifier 230. The extended class will be discussed in detail below.

In step S303, the class identifier 230 executes a class discrimination step. More specifically, a second stage of discriminators (second discriminator) held in the second discriminator holder 260 is used to identify the extended class set in the extended class setting step (step S302) to which the object 130 in an input image belongs.

Thus, in the class discrimination step (step S303), the second discriminator executes discrimination processing on an extended class that includes the candidate class output in the candidate class output step and the class that was newly included in the extended class setting step. We shall assume that the defined class is set by performing learning processing using a learning image stored ahead of time in the discriminator learning-use data holder 240.

Thus, in this embodiment, the robustness of discrimination processing in the second discriminator is improved by increasing the candidate classes in executing discrimination processing at the second discriminator.

The above-mentioned processing performed by the information processing apparatus 120 will now be described in detail.

4. Details of Processing Performed by Information Processing Apparatus

4.1 Details of Learning Processing

First, we will describe a learning image, and learning processing used to calculate the following information set in the first discriminator on the basis of this learning image.

Figure 5:
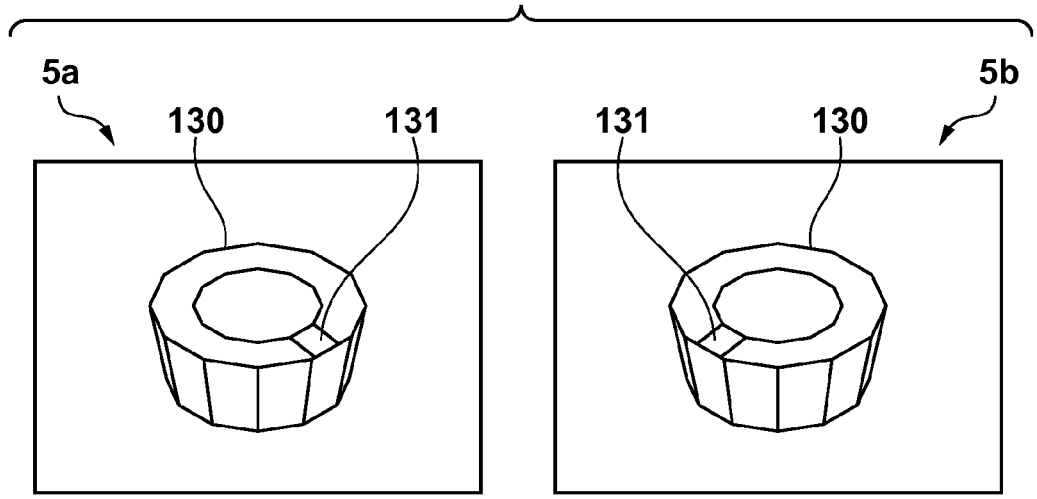
FIG. 5 shows a plurality of learning images from different viewpoints.

- Characteristic quantity of characteristic points
- Class of learning image
- Vector from each characteristic point to reference point
- Representative vector used in associating with characteristic point of input image
- Characteristic points included in each cluster i) Learning Image First, we will describe the learning image used in learning processing. FIG. 4 is a diagram illustrating a learning image. As shown in FIG. 4, an image obtained by capturing the object 130 from perspectives 401 of a geodesic dome 400 that surrounds the object 130 is utilized as a learning image. FIG. 5 shows learning images obtained by capturing the object 130 at two of the plurality of viewpoints 401. FIG. 5 is just an example of a learning image, and we will assume that in performing learning processing, learning images of the object 130 are acquired in a number at least equivalent to the number of perspectives in the geodesic dome 400 shown in FIG. 4.

ii) Flow of Learning Processing

Figure 6:
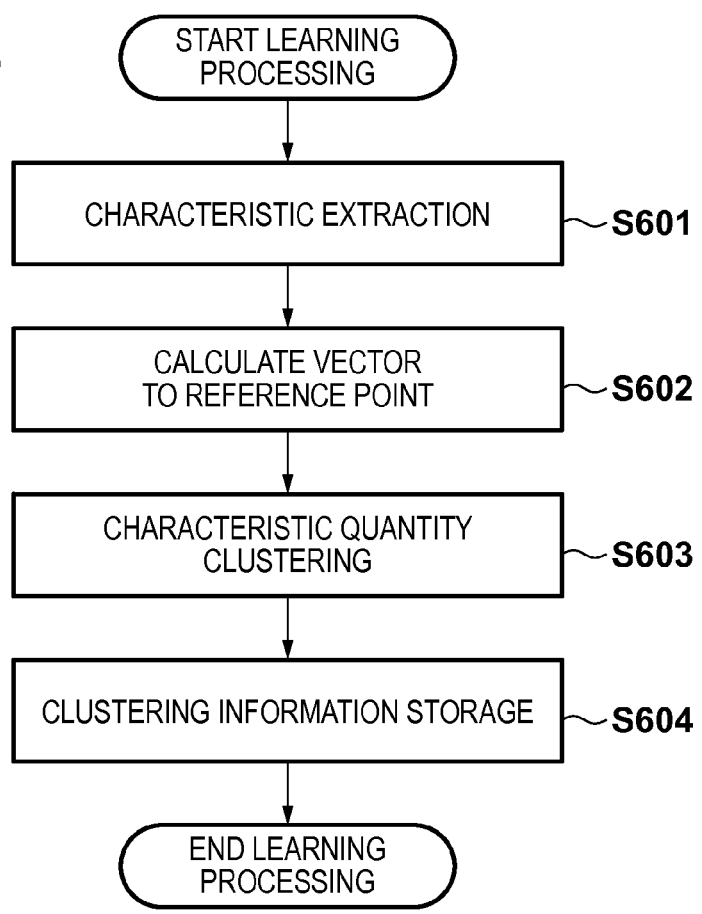
FIG. 6 is a flowchart showing the flow of learning processing.

Learning processing will now be described. FIG. 6 is a flowchart showing the flow of learning processing for calculating the above-mentioned information used in executing discrimination processing based on a reference point, which is executed by the first discriminator.

In step S601, characteristic points $f_i$ are extracted from the learning images and stored. The characteristic quantities $F_i$ ($i=1, 2, \ldots, N$) of the characteristic points $f_i$ in the learning images, and the class of the learning images (the type and orientation of the object 130) are stored. We shall let $ID_i$ be an index indicating the class of each learning image ($i=1, 2, \ldots, N$). We shall also let $ID_i$ be a value from 1 to P (where P is the total number of classes).

Then, in step S602, the vector from the characteristic points $f_i$ to the reference point $O_j$ is calculated. The vector calculation processing shown in step S602 will now be described in specific terms through reference to FIG. 7.

Figure 7:
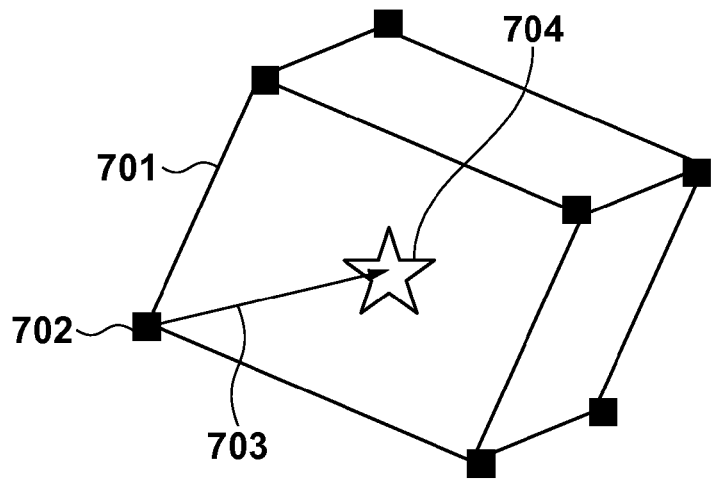
FIG. 7 is a diagram illustrating vector calculation processing.

FIG. 7 is a diagram schematically illustrating the relation between the reference point and some of the characteristic points extracted from the learning image belonging to a certain class. In FIG. 7, 701 is a part of the object 130, 702 is a characteristic point, 703 is the vector from a certain characteristic point to the reference point, and 704 is the reference point. There are seven characteristic points in FIG. 7, and reference number 702 indicates one of these characteristic points.

In processing to calculate the vector to the reference point, a vector $M_n=(x_o-x_n, y_o-y_n)$ from the position $f_n=(x_n, y_n)$ of the characteristic point 702 of the part 701 of the object to the reference point $O=(x_o, y_o)$ set for the part 701 of the object (here, the center of the object) is calculated.

The vector $M_{ij}$ (i=1, 2, ..., N, j=1, 2, 3, ...) from each characteristic point $f_i$ to the reference point $O_j$ is calculated for the entire learning image, after which the flow proceeds to step S603.

In step S603, clustering is performed according to the characteristic quantities $F_i$ (i=1, 2, ..., $N_{all}$) for all of the obtained characteristic points $f_i$ (i=1, 2, ..., $N_{all}$). Here, $N_{all}$ indicates the number of characteristic points extracted from the entire learning image. The clustering method may be k-means, or any other clustering method may be used, such as using a self-organizing map algorithm. For example, with k-means, clustering can be accomplished by using the Euclidean distance between the characteristic quantities $F_i$, with the number of clusters K specified.

In step S604, clustering information is stored. More specifically, the representative vectors $F_k'$ (k=1, 2, ..., K) (K is the number of clusters and k is an index) of the clusters, and the characteristic points included in these clusters, are stored. The representative vectors $F_k$ and characteristic points are utilized in associating the characteristic points extracted from the input image with the characteristic points of the learning image. The above processing ends the learning processing.

In the above description, k-means was given as an example of a clustering method for clustering the characteristic points extracted from the entire learning image according to the characteristic quantities, but the present invention is not limited to or by this. For example, a random forest method, which is an ensemble learning method (see U.S. Pat. No. 6,009,199, for example), may be used. In the random forest method, pattern recognition is performed using a plurality of decision trees.

With a random forest method, information is randomly requested at each node, the learning pattern is split up again and again according to the request result, and the decision tree is steadily branched. A learning pattern that remains upon arriving at a leaf node is stored as a classification result of that leaf node. In this embodiment, the learning pattern is classified as characteristic points of each learning image.

4.2 Candidate Class Output Processing at Candidate Class Output Unit

Figure 8:
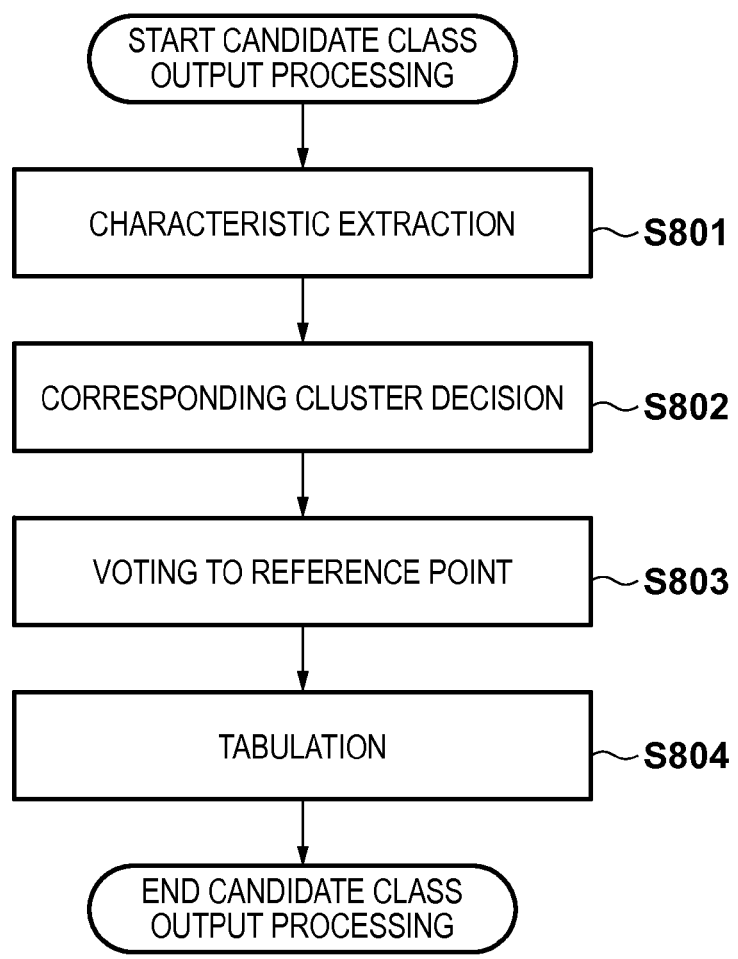
FIG. 8 is a flowchart showing the flow of candidate class output processing.

The candidate class output processing performed by the candidate class output unit 210 will now be described. FIG. 8 is a flowchart showing the flow of candidate class output processing.

In step S801, just as in learning processing, characteristic points are extracted from an input image obtained by capturing an object. In step S802, the cluster with the highest similarity is decided by calculating the distance between the representative vector for each cluster and the characteristic quantities of the extracted characteristic points. Consequently, it is possible to associate the characteristic points extracted from the input image with the characteristic points of the learning image. When a random forest method is used, leaf nodes are determined by classifying the characteristic points extracted from the input image. The same applies when another classification tree is used.

In step S803, the vector to the reference point is read, which is stored added to the characteristic points in the cluster to which the representative vectors found by association belong. The vector thus read out is used to calculate the reference point for each of the characteristic points extracted from the input image, and voting is performed in a voting space. In this embodiment, the voting space is a space formed by three axes: the x and y axes of the image coordinates, and the axis expressing the class ID.

Figure 9:
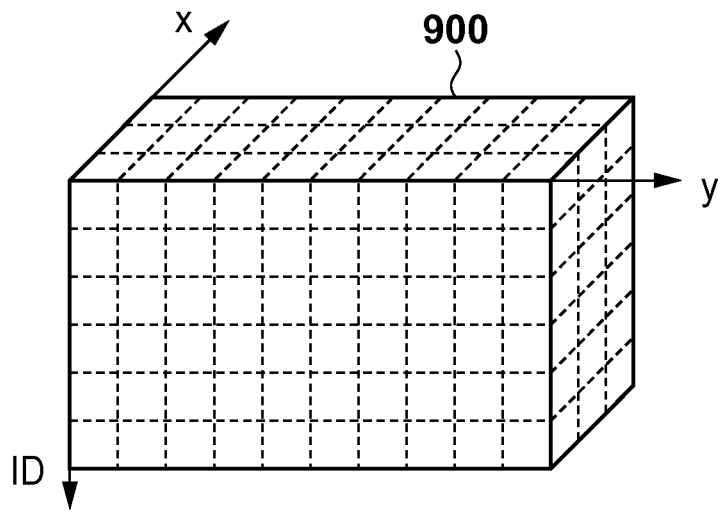
FIG. 9 shows an example of a voting space.

FIG. 9 shows an example of a voting space formed by the x and y axes of the image coordinates and the axis expressing the class ID. In FIG. 9, 900 is the voting space. We will assume that the size of each cell in the voting space 900 has already been set as shown in FIG. 9.

The specific voting method here will be described through reference to the voting space 900 shown in FIG. 9. The cluster k" with the highest similarity is determined by comparing the characteristic quantity $G_m$ of each of the characteristic points $g_m=(x_m, y_m)$ (m=1, 2, ..., M) (M is the total number of characteristic points extracted from the input image, and m is an index indicating the characteristic points) extracted from the input image, with the representative vector $F_k'$ (k=1, 2, ..., K) of each cluster obtained by learning processing.

For example, the following Formula 1 is used when calculating from the Euclidean distance between the representative vector $F_k'$ (k=1, 2, ..., K) of each cluster and the characteristic quantity $G_m$ of each of the extracted characteristic points $g_m$.

$$k'' = \underset{k}{\mathrm{argmin}} |g_m - F_k'| \quad \text{[Formula 1]}$$

Voting processing is performed according to the class $ID_i$ (i=1, 2, ..., N) and the vector $M_{ij}$ (i=1, 2, ..., N, j=1, 2, 3, ...) to the reference points stored added to the characteristic points $f_i$ included in the determined cluster. More specifically, if we let the voting points in the voting space 900 be (x, y, ID), then the voting points are calculated from the following Formula 2.

$$(x,y)=(x_m,y_m)+M_{ij}$$

$$ID=ID_i \quad \text{[Formula 2]}$$

Actually, a vote is added to a cell corresponding to the (x, y, ID) that was found. The processing here is performed on all the characteristic points in the cluster determined to have the highest similarity for the characteristic points extracted from the input image. The total number of votes in this case is a maximum N×M.

In step S804, the cell with the maximum number of votes in the voting space 900 that underwent voting in step S803 is extracted. Alternatively, the cell with the most votes over a specific number (number of candidates) or the cell that is over a predetermined threshold may be extracted. Here, we will assume that the number of candidates is P (P≤1), and each candidate class is $(x_p, y_p, ID_p)$.

4.3 Extended Class Setting Processing Performed by Extended Class Setting Unit

The extended class setting processing performed by the extended class setting unit 220 will now be described through reference to FIGS. 10 to 12. In extended class setting processing, the extended class is set in the discriminating space for which the candidate class has been set, with respect to the candidate classes $(x_p, y_p, ID_p)$ (p=1, 2, ..., P) output in candidate class output processing.

Figure 10:
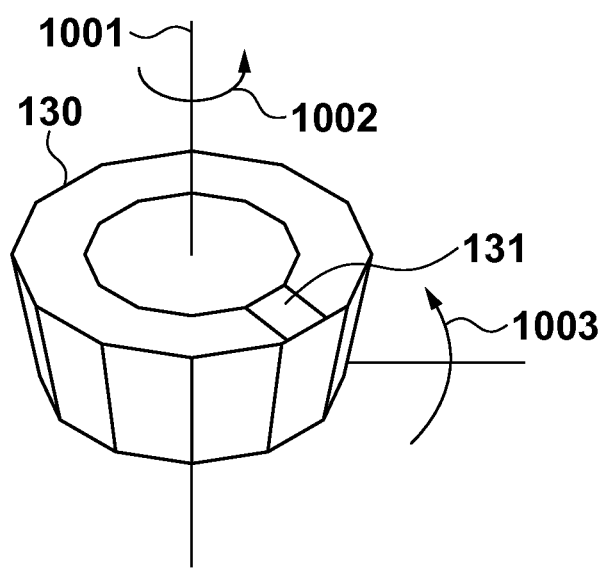
FIG. 10 is a diagram illustrating extension class setting processing.

As shown in FIG. 10, the orientation of the object 130 is set in three degrees of freedom, in which the rotational angle with respect to the coordinate axes (X, Y, and Z axes) in the world coordinate system is the characteristic quantity. In FIG. 10, 1001 is the Z axis of the object 130, and the object 130 is shown rotated by a rotational angle 1002 around the Z axis 1001. 1003 shows the rotational direction of the object 130 around the Y axis.

In discrimination processing at the first discriminator, we will assume that of the six degrees of freedom of the discriminating space, it is easy to estimate a characteristic quantity expressing the rotational angle around the X and Y axes other than the rotational angle 1002 around the Z axis 1001. In this embodiment, since orientation is treated as a class, of the three characteristic quantities, the class (orientation) closer to the two characteristic quantities other than the rotational angle 1002 with respect to the Z axis 1001 shall be assumed to be learned during learning processing.

Figure 11:
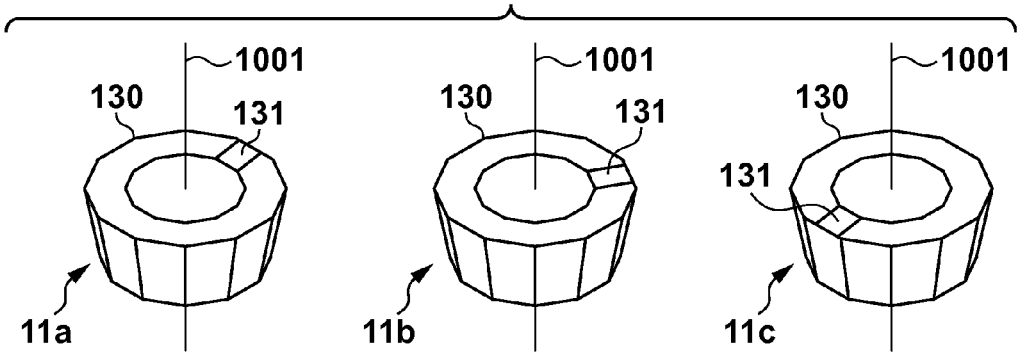
FIG. 11 is a diagram illustrating extension class setting processing.

FIG. 11 shows an example of the class (orientation) closer to the characteristic quantities for the rotational angles of the two rotational axes other than the rotational angle 1002 with respect to the Z axis 1001 of the object 130.

Figure 12:
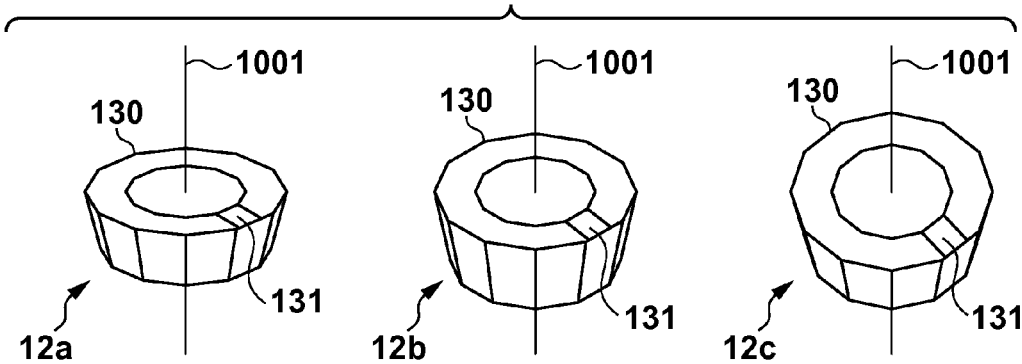
FIG. 12 is a diagram illustrating extension class setting processing.

FIG. 12 is a diagram of classes 12*a* and 12*c* rotated in the rotational direction 1003 with respect to the candidate class shown by 12*b*. 12*a* and 12*c* both have the same rotational angle 1002 with respect to the Z axis 1001. These classes are combined, and the resulting class shall be termed an extended class.

That is, since the extended class includes a plurality of candidate classes, when the second discriminator identifies whether or not a class belongs to this extended class, robustness is improved in discrimination processing by the second discriminator.

The concept behind the extended class setting processing performed by the extended class setting unit 220 will now be described using a discriminating space. In extended class setting processing, the range defined as the discriminating space of a candidate class is extended in order to improve robustness between at least one set of candidate classes out of the candidate classes identified by the first discriminator.

Figure 13:
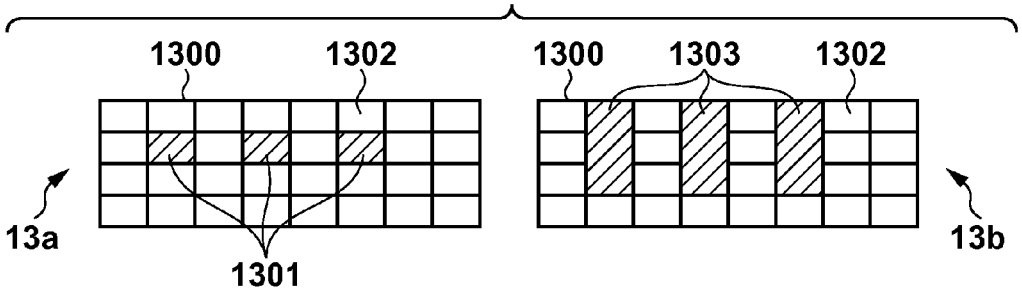
FIG. 13 is a diagram illustrating the concept behind extension class setting processing.

13*a* and 13*b* in FIG. 13 are diagrams in which a discriminating space is used to express the concept behind extended class setting processing. In 13*a* and 13*b* of FIG. 13, 1300 is the entire discriminating space. 1302 is a partial discriminating space obtained by segmenting the discriminating space 1300.

Discriminating the class of an object corresponds to deciding, in the discriminating space 1300, the partial discriminating space 1302 to which the object 130 belongs. In this embodiment, the class of the object 130 is decided by using a first stage of discriminators and a second stage of discriminators, but there may be three or more stages of discriminators.

In 13*a* in FIG. 13, 1301 is the class output as a candidate class for the object 130 by the first discriminator. 13*b* in FIG. 13 shows the situation when the candidate classes of 13*a* in FIG. 13 are extended so as to improve the robustness between candidate classes, and 1303 is an extended class obtained by extending the candidate classes.

Thus setting the extended class allows not only the candidate classes identified by the first discriminator, but also classes around the candidate classes (classes adjacent to candidate classes in the discriminating space) to be utilized in discriminating the class of the object 130 with the second discriminator.

Figure 14:
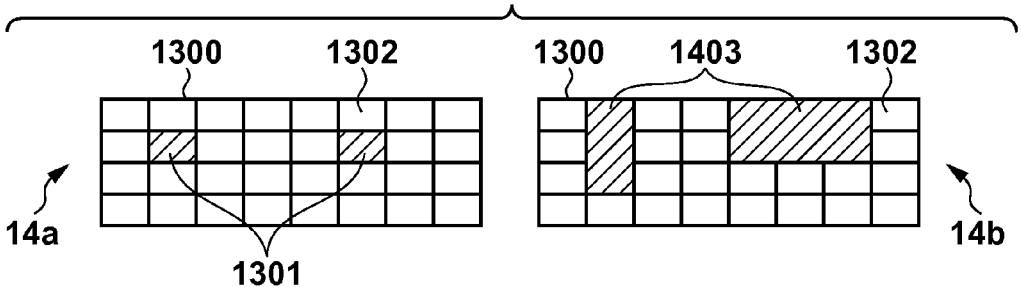
FIG. 14 is a diagram illustrating the concept behind extension class setting processing.

We shall assume that the extended class has been preset. Also, it may be set for each candidate class individually, and as shown in 14*a* and 14*b* of FIG. 14, different extended classes may be set for the candidate classes 1301 (see 1403).

4.4 Class Discrimination Processing Performed by Class Identifier

The class discrimination processing performed by the class discriminator 230 will now be described. In class discrimination processing, the second discriminator held in the second discriminator holder 260 is used to decide on the final class to which the object 130 belongs, from among the extended class set in extended class setting processing.

In the case of the object 130, there is a characteristic 131 (see FIG. 1, etc.) that is valid for discrimination processing of the class. Therefore, an evaluation value is calculated by using a template of the characteristic 131 of the object 130 in each class included in the extended class, and performing template matching to the corresponding portion of the input image.

Here, we will let c be the number of classes included in the extended class, Tc be the template corresponding to each class, Mc×Nc be the size of each template, and Tc (i, j) be the pixel value at a position (i, j) of the template Tc. We will also let I (i, j) be the pixel value for the input image superposed with the template Tc. In this case, the similarity Rc between the template Tc and the input image is calculated from the following Ncc (normalized cross-correlation). Another similarity may be used instead, however.

$$R_C = \frac{\sum_{j=0}^{N_c-1}\sum_{i=0}^{M_c-1} I(i,j)T_c(i,j)}{\sqrt{\sum_{j=0}^{N_c-1}\sum_{i=0}^{M_c-1} I(i,j)^2 \times \sum_{j=0}^{N_c-1}\sum_{i=0}^{M_c-1} T_c(i,j)^2}} \quad \text{[Formula 3]}$$

The search range region W of the template is set on the basis of the candidate classes output in the candidate class output step (step S301). The position at which the similarity Rc is at its maximum for each template Tc is detected from within the search range region W, and this similarity is termed $\overline{R}_c$. $\overline{R}_c$ is estimated for every class included in the extended class, and the evaluation values thereof are added up. Consequently, the ultimate evaluation value R is as expressed by the following formula.

$$R = \sum_c \overline{R}_c \quad \text{[Formula 4]}$$

A weighted addition method may also be used, in which a weight ωc is defined for each evaluation value (Formula 5).

$$R = \sum_c \omega_c \overline{R}_c \quad \text{[Formula 5]}$$

R is calculated for every extended class, and the extended class for which R is at its maximum is identified. Thus evaluating not just the similarity of the templates of candidate classes, but also the evaluation values R to which the similarity of templates of adjacent classes is added, improves the robustness of discrimination processing by the second discriminator. When an extended class is identified, in the class discrimination step the corresponding candidate class output in the candidate class output step (step S301) is decided as the final class.

Just as in the candidate class output step (step S301), a random forest method or other such classification tree or discriminator may be utilized as the second discriminator. In this case, a classification tree may be produced using a learning image of the characteristic 131 for many different classes, or modified characteristics, as a learning pattern. During discrimination processing, the final class is decided by performing combination processing such as voting for the classification results.

As is clear from the above description, with the information processing apparatus 120 according to this embodiment, in using the first and second discriminator to perform discrimination processing, adjacent classes within the discriminating space are extracted for candidate classes output by the first discriminator. These candidate classes are combined with the classes adjacent to these candidate classes to form an extended class, and the second discriminator performs discrimination processing on this extended class.

As a result, the robustness of discrimination processing performed by the second discriminator is better than when discrimination processing is executed by a second discriminator on candidate classes output by a first discriminator as in the past.

Second Embodiment

In the first embodiment above, in order to improve the robustness of discrimination processing by the second discriminator, the extended class is set wider than the candidate classes output by the first discriminator, and the second discriminator executes discrimination processing on this extended class.

However, the method for improving the robustness of discrimination processing by the second discriminator is not limited to this. For example, the configuration may be such that each of the candidate classes output from the first discriminator is marginalized in the discriminating space used in discriminating processing by the first discriminator, and the second discriminator compares these marginalized candidate classes to decide on the final class. This embodiment will now be described in detail.

1. Functional Configuration of Information Processing Apparatus

Figure 15:
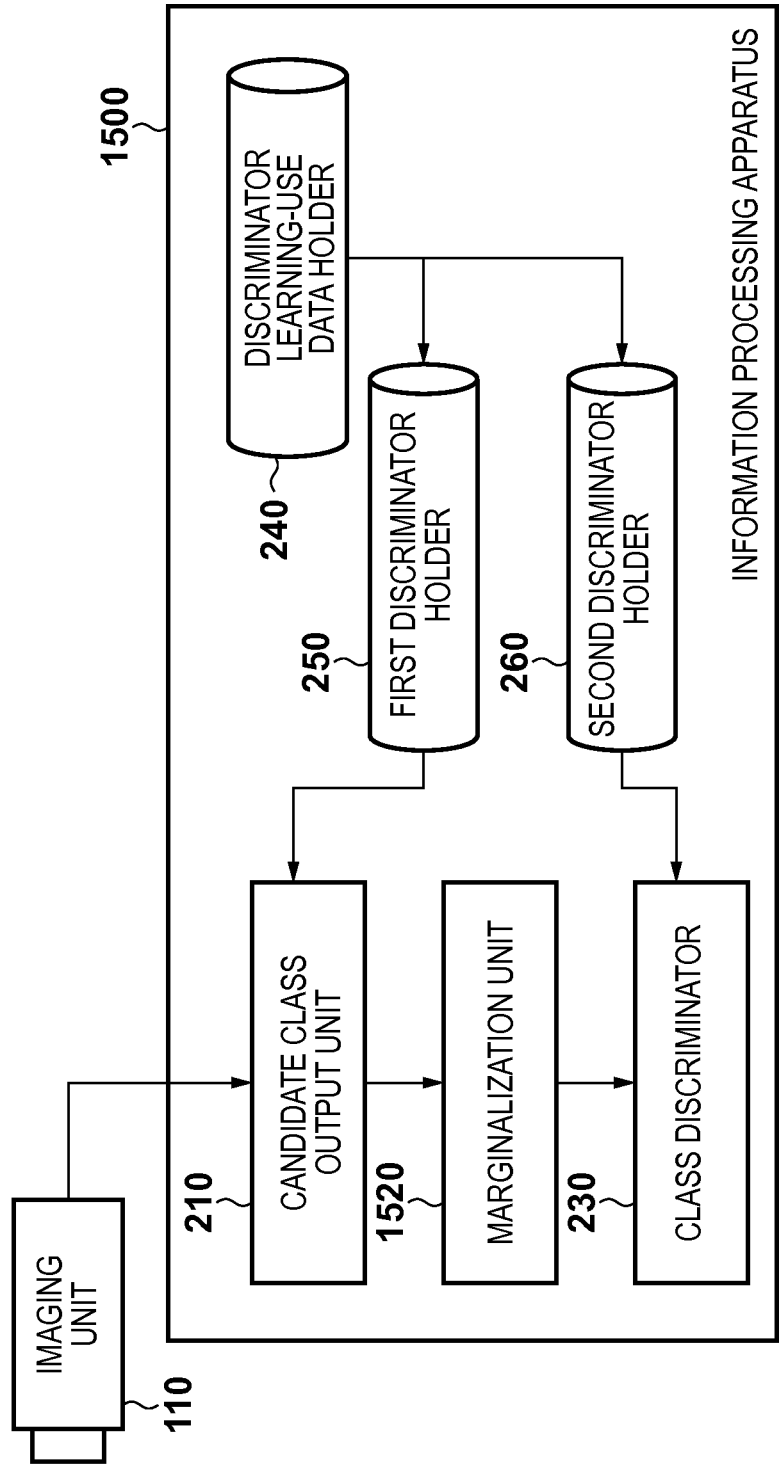
FIG. 15 is a diagram illustrating the functional configuration of an information processing apparatus 1500.

First, the functional configuration of the information processing apparatus according to this embodiment will be described. FIG. 15 is a diagram illustrating the functional configuration of the information processing apparatus 1500 according to this embodiment. As shown in FIG. 15, the basic configuration of the information processing apparatus 1500 is substantially the same as that of the information processing apparatus 120 according to the first embodiment described through reference to FIG. 2, the difference being that a marginalization unit 1520 is provided instead of the extended class setting unit 220.

2. Summary of Discrimination Processing by Information Processing Apparatus

Figure 16:
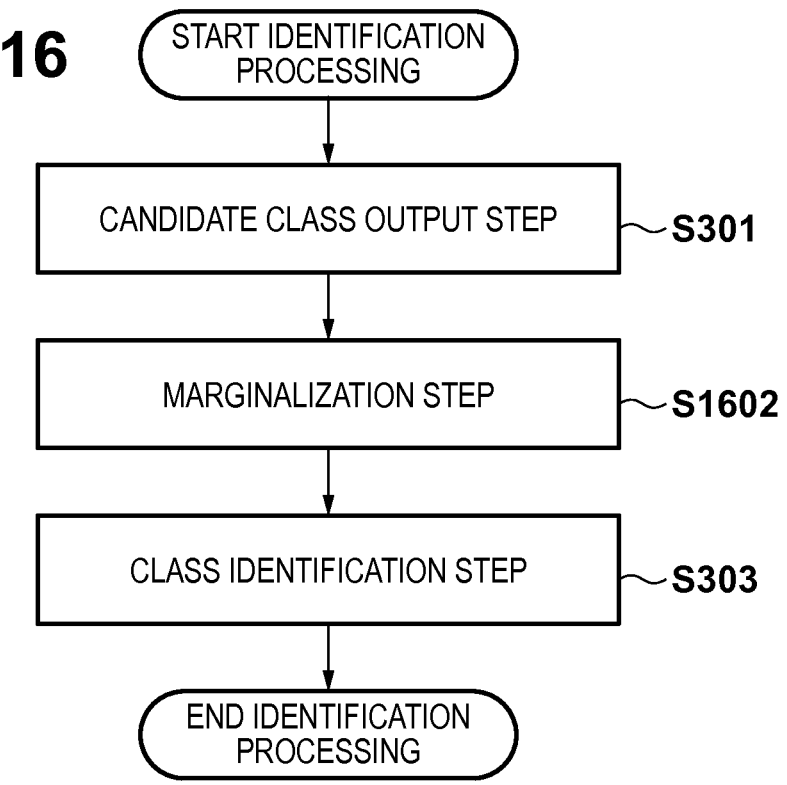
FIG. 16 is a flowchart showing the flow of discrimination processing performed on the object 130 by the information processing apparatus 1500.

Next, the discrimination processing performed on the object 130 by the information processing apparatus 1500 will be described. FIG. 16 is a flowchart showing the flow of discrimination processing performed on the object 130 by the information processing apparatus 1500.

As shown in FIG. 16, the flow of discrimination processing in the information processing apparatus 1500 is substantially the same as the discrimination processing in the information processing apparatus 120 according to the first embodiment described above through reference to FIG. 3. However, there is a difference in the content of the processing in the candidate class output step, and in that a marginalization step is executed instead of the extended class setting step. The following description will focus on these differences. An example of personal verification through facial recognition is described.

3. Details of Processing Performed by Information Processing Apparatus 3.1 Candidate Class Output Processing Performed by Candidate Class Output Unit The extended class output step performed by the candidate class output unit 210 in step S301 will be described. In the candidate class output step, the candidate class output unit 210 causes the first discriminator held in the first discriminator holder 250 to execute discrimination processing for the input image obtained by capturing an object with the imaging unit 110, thereby acquiring a plurality of candidate classes from this first discriminator.

Figure 17:
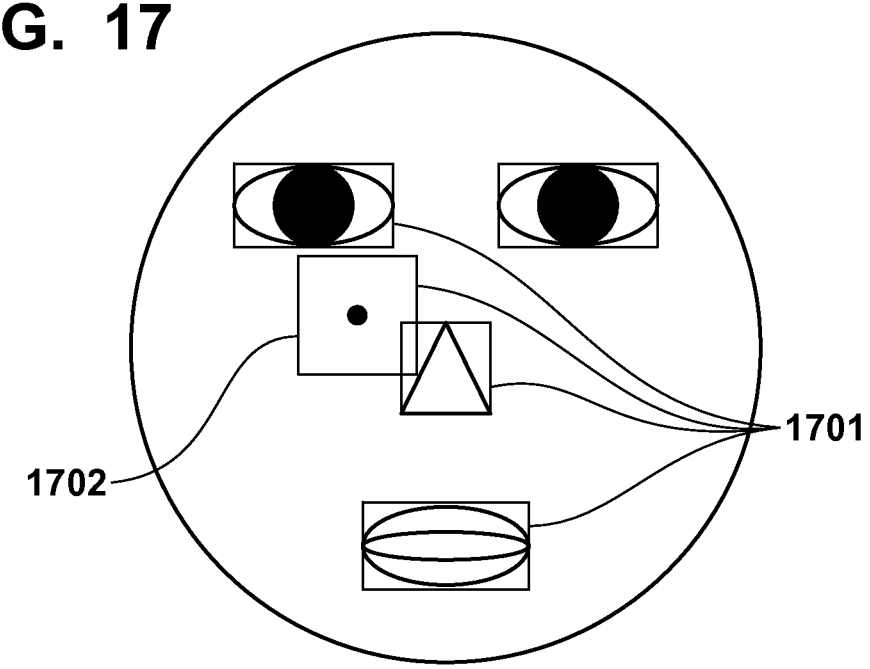
FIG. 17 shows an example of a characteristic point when the object is an individual's face.

Here, N characteristic points are defined for facial recognition in the discrimination processing performed by the first discriminator. For example, characteristic points expressing the locations of the eyes, nose, mouth, etc., are defined ahead of time. FIG. 17 shows an example of characteristic points when the object is a person's face. In FIG. 17, 1701 indicates the characteristic points utilized by the first discriminator, such as the eyes, nose, and mouth. 1702 is a characteristic that is valid for personal verification.

We will let $X_\theta$ ($\theta=1, 2, \ldots, N$) be a probability variable defined by each characteristic $F_\theta$ ($\theta=1, 2, \ldots, N$). Using a person as a class, we will let $Y_\phi$ ($\phi=1, 2, \ldots, M$) be the probability variable defined by each person $y_\phi$ ($\phi=1, 2, \ldots, M$).

The simultaneous probability $\Pr[y_\phi, X_1, X_2, \ldots, X_\theta]$ of a certain person class $y_\phi$ ($\phi=1, 2, \ldots, M$) estimated from all the characteristics is calculated, and the position at which this value is greater than a specific value is output as a personal discrimination candidate region.

Figure 18:
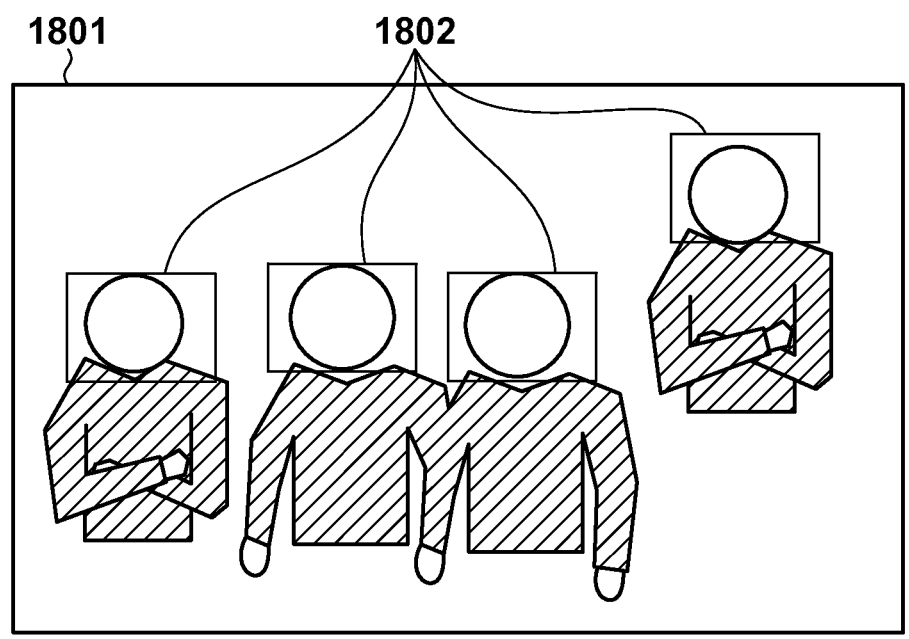
FIG. 18 shows an example of a candidate class output by execution of a candidate class output step.

FIG. 18 shows an example of a candidate class output by executing the candidate class output step. As shown in FIG. 18, a personal discrimination candidate region 1802 is detected and output as a candidate class with respect to an input image 1801 obtained by capturing with the imaging unit 110.

3.2 Marginalization Processing Performed by the Marginalization Unit

Next, a marginalization step executed in step S1602 by the marginalization unit 1520 will be described. In the marginalization step (S1602), the marginal probability $\Pr[X_{\theta'}]$ is calculated, rather than calculating the simultaneous probability $\Pr[y_\theta, Xe_{\theta'}]$ defined by the characteristic $F_{\theta'}$ that is valid for verifying a person, and this improves the robustness of discrimination processing performed by the second discriminator.

For example, we will let X and Y be two probability variables, and assume that these respectively correspond to class and characteristic quantity. We will assume that the class X can take any value $x_i$ ($i=1, 2, \ldots, M$) and the characteristic quantity Y any value $y_j$ ($j=1, 2, \ldots, L$). Here, if we let the class be the type of object, and the characteristic quantity be the incidence of each dimension of a SHIFT characteristic quantity, then when the candidate class output in the candidate class output step is $x_k$ ($k=1, 2, \ldots, M$), the marginal probability $p(Y=y_k)$ related to a specific characteristic quantity $y_k$ can be calculated from the following equation. We will assume here that a plurality of marginalized variables $x_n$ have been decided on in relation to each candidate class.

$$p(Y=y_k)=\Sigma p(X=x_n, Y=y_k) \quad \text{[Formula 6]}$$

In this embodiment, a characteristic that is valid for verifying a certain person is identified by utilizing the same characteristic data for a plurality of people to calculate just the existence probability of that characteristic.

3.3 Class Discrimination Processing Performed by the Class Identifier

Next, class discrimination processing performed by the class discriminator 230 will be described. In class discrimination processing, the region in which the value of the marginal probability $\Pr[X_{\theta'}]$ calculated in the marginalization step (step S1602) is the largest or is greater than a specific value out of the personal candidate region output as the candidate class in the candidate class output step (step S301) is termed the position of a person $y_\theta$ ($\theta=1, 2, \ldots, M$).

As is clear from the above description, in this embodiment, the configuration is such that the candidate classes output from the first discriminator are marginalized in the discriminating space used for discrimination processing by the first discriminator. Consequently, just as in the first embodiment above, it is possible to improve the robustness of discrimination processing performed by the second discriminator.

Third Embodiment

In the first embodiment above, to improve the robustness of discrimination processing performed by the second discriminator, the configuration was such that the extended class was set wider than the candidate classes output by the first discriminator, and the second discriminator executed discrimination processing on this extended class.

In the second embodiment above, the configuration was such that the candidate classes output from the first discriminator were marginalized in the discriminating space used in discrimination processing performed by the first discriminator.

However, the present invention is not limited to this. For example, in using second discriminator to identify the candidate classes output from the first discriminator, the configuration may be such that a plurality of characteristic points and classes are newly set for each candidate class, and the discrimination results for the characteristic points of this plurality of classes are combined in making a determination. This embodiment will now be described in detail.

1. Functional Configuration of Information Processing Apparatus

Figure 19:
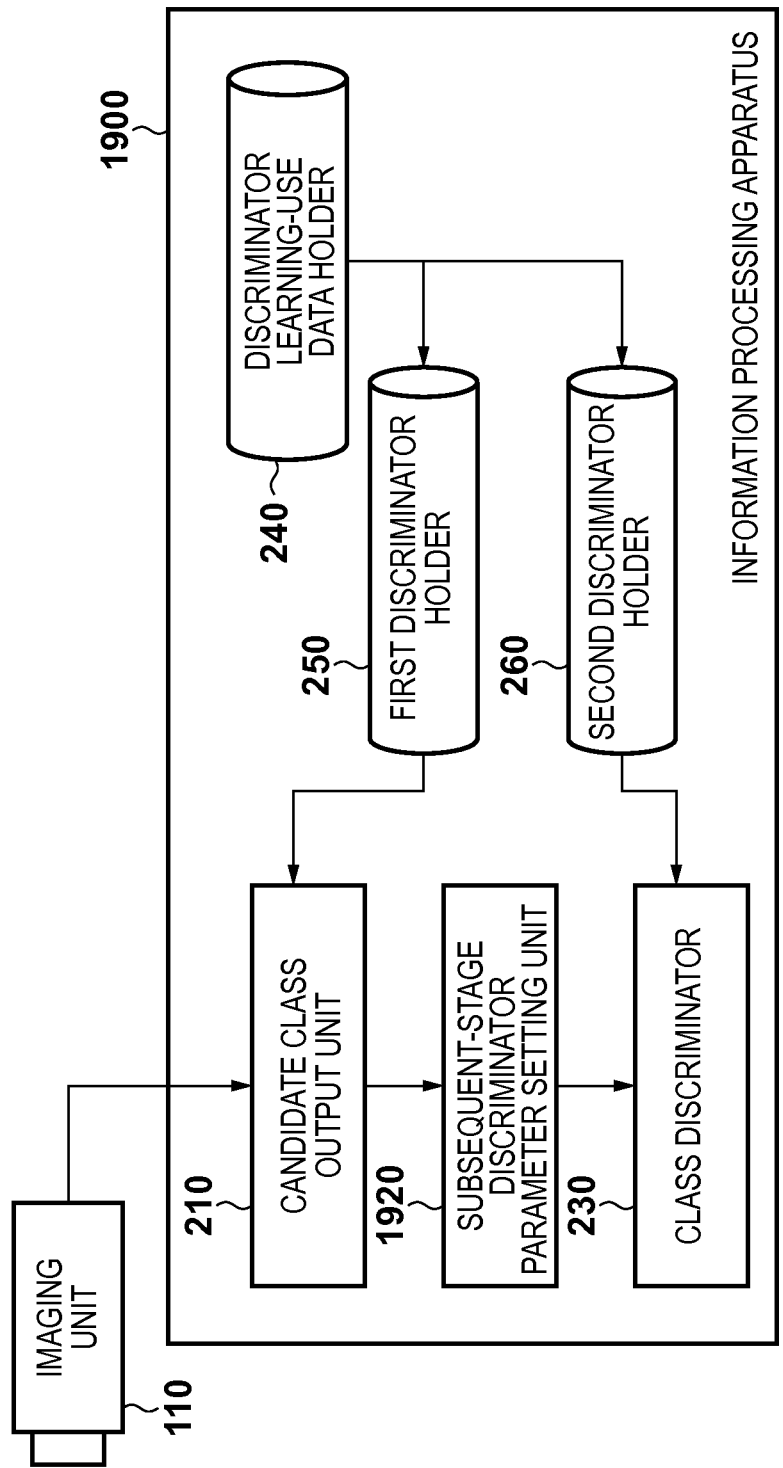
FIG. 19 is a diagram illustrating the functional configuration of an information processing apparatus 1900.

First, the functional configuration of the information processing apparatus according to this embodiment will be described. FIG. 19 is a diagram illustrating the functional configuration of the information processing apparatus 1900 according to this embodiment. As shown in FIG. 19, the basic configuration of the information processing apparatus 1900 is substantially the same as that of the information processing apparatus 120 according to the first embodiment described through reference to FIG. 2, the difference being that a subsequent-stage discriminator parameter setting unit 1920 is provided instead of the extended class setting unit 220.

2. Summary of Discrimination Processing by Information Processing Apparatus

Next, the discrimination processing performed on the object 130 by the information processing apparatus 1900 will be described. FIG. 20 is a flowchart showing the flow of discrimination processing performed on the object 130 by the information processing apparatus 1900.

As shown in FIG. 20, the flow of discrimination processing in the information processing apparatus 1900 is substantially the same as the discrimination processing in the information processing apparatus 120 according to the first embodiment described above through reference to FIG. 3. However, there is a difference in the content of the processing in the candidate class output step, and in that a subsequent-stage discriminator parameter setting step is executed instead of the extended class setting step. The following description will focus on these differences. A case in which the object 130 shown in FIG. 4 is identified will be described below.

3. Details of Processing Performed by Information Processing Apparatus 3.1 Subsequent-Stage Discriminator Parameter Setting Performed by Subsequent-Stage Discriminator Parameter Setting Unit The subsequent-stage discriminator parameter setting step executed in step S2002 by the subsequent-stage discriminator parameter setting unit 1920 will be described.

In the subsequent-stage discriminator parameter setting step, a dictionary or parameters for the second discriminator are set so as to improve the robustness of discrimination processing by the second discriminator with respect to the candidate classes output in the candidate class output step S301 ($x_p$, $y_p$, $ID_p$) (p=1, 2, ..., P).

In the case of the object 130 shown in FIG. 4, since there is a characteristic 131 that is valid for the discrimination of a class, in performing learning processing with the first discriminator, characteristic points acquired from near the characteristic 131 of the learning image of each orientation class are recorded. In the subsequent-stage discriminator parameter setting step (step S2002), the orientation class $ID_p'$ and the characteristic point $f_p'$ voted (combined) in discrimination performed in the class discrimination step (step S303) are set as parameters for every candidate class. The orientation class $ID_p'$ is set a plurality of times for the $ID_p$ of the candidate classes, and the discrimination results for the characteristic point $f_p'$ of a plurality of classes are combined, which improves the robustness in discrimination processing by the second discriminator.

The description here was of characteristic points, but it may instead be a partial region, a HOG, or another such region characteristic. Also, the discrimination method used by the discriminator may be a random forest method, template matching, or any other discrimination method. Since the above-mentioned parameters can be set during discrimination processing, the first discriminator and second discriminator may be the same.

Also, the configuration may be such that a dictionary that classifies a characteristic point $f_p'$ acquired ahead of time and off-line near the characteristic 131 and other characteristic points acquired from the learning image is learned, and is used as a discrimination dictionary in the class discrimination step (step S303).

3.2 Class Discrimination Processing Performed by the Class Identifier

Next, the class discrimination step executed in step S303 by the class identifier 230 will be described.

In the class discrimination step (step S303), discrimination processing is performed using a dictionary or parameters of the discriminator set in the subsequent-stage discriminator parameter setting step (step S2002) for the candidate classes output in the candidate class output step (step S301).

As is clear from the above description, in this embodiment, in using the second discriminator to identify the candidate classes output from the first discriminator, a plurality of characteristic points and classes are newly set for the candidate classes, and a decision is made after combining the discrimination results for the characteristic points of this plurality of classes.

Consequently, just as in the first embodiment above, the robustness of discrimination processing can be improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264117 filed Dec. 1, 2011, which is hereby incorporated by reference herein in its entirety.

What is claimed is:

1. An information processing method of identifying a class of an object by using a plurality of discriminators, the method comprising:
    acquiring, as a plurality of candidate classes, a plurality of classes discriminated at a first stage of the discriminators; and
    setting, in a second stage of the discriminators, a class of the second stage of the discriminators, which is defined as a combined partial space which is formed by combining a first partial space which shows a first range of each of the plurality of candidate classes and a second partial space which shows a second range different from the first range used in discriminating each of the plurality of candidate classes at the first stage of the discriminators, as a class to be discriminated at the second stage of the discriminators, wherein the first range, the second range, and the combined range are in a same discriminating space.

2. The information processing method according to claim 1, wherein the class which is set in the second stage of the discriminators includes a class that identifies an orientation of the object.

3. The method according to claim 1, wherein a class set to the second stage of the discriminators includes a plurality of classes, and the plurality of classes set different partial spaces respectively.

4. An information processing apparatus that uses a plurality of stages of discriminators to identify a class of an object, the apparatus comprising:
    an acquisition unit that acquires, as a plurality of candidate classes, a plurality of classes discriminated at a first stage of the discriminators; and
    a setting unit that sets in a second stage of the discriminators, a class of the second stage of the discriminators, which is defined as a combined partial space which is formed by combining a first partial space which shows a first range of each of the plurality of candidate classes and a second partial space which shows a second range different from the first range used in discriminating each of the plurality of candidate classes at the first stage of the discriminators, as a class to be discriminated at the second stage of the discriminators, wherein the first range, the second range, and the combined range are in a same discriminating space.

5. A non-transitory computer-readable recording medium that stores a program for causing a computer to function as the units of the information processing apparatus according to claim 4.

* * * * *